(12) United States Patent
Feuillette et al.

(10) Patent No.: US 10,460,530 B2
(45) Date of Patent: Oct. 29, 2019

(54) LOCALIZATION OF TRANSACTION OF TAGS

(71) Applicant: Conduent Business Services, LLC, Dallas, TX (US)

(72) Inventors: Rémi Feuillette, Valence (FR); Pascal Roux, Chabeuil (FR); Cédric Chapignac, Upie (FR)

(73) Assignee: Conduent Business Services, LLC, Florham Park, NJ (US)

( * ) Notice: Subject to any disclaimer, the term of this patent is extended or adjusted under 35 U.S.C. 154(b) by 675 days.

(21) Appl. No.: 15/000,299

(22) Filed: Jan. 19, 2016

(65) Prior Publication Data
US 2017/0206715 A1    Jul. 20, 2017

(51) Int. Cl.
| | |
|---|---|
| *G06Q 20/32* | (2012.01) |
| *G07B 15/02* | (2011.01) |
| *H04W 4/42* | (2018.01) |
| *H04W 4/029* | (2018.01) |
| *G06Q 20/08* | (2012.01) |

(Continued)

(52) U.S. Cl.
CPC ............ *G07B 15/02* (2013.01); *G06Q 20/085* (2013.01); *G06Q 20/322* (2013.01); *G07B 15/00* (2013.01); *G08G 1/00* (2013.01); *G08G 1/123* (2013.01); *H04W 4/029* (2018.02); *H04W 4/046* (2013.01);
(Continued)

(58) Field of Classification Search
CPC ........ G07B 15/02; G07B 15/00; G08G 1/123; G08G 1/00; G06Q 20/322; G06Q 20/401; G06Q 2220/00; G06Q 50/30; H04W 4/046; H04W 4/80
See application file for complete search history.

(56) References Cited

U.S. PATENT DOCUMENTS

| | | | |
|---|---|---|---|
| 6,671,737 B1 | 12/2003 | Snowdon et al. | |
| 6,813,503 B1 * | 11/2004 | Zillikens | G08G 1/0962 455/457 |

(Continued)

FOREIGN PATENT DOCUMENTS

| | | |
|---|---|---|
| WO | WO 2015/10018 A1 | 7/2015 |
| WO | WO 2015/127095 A1 | 8/2015 |

OTHER PUBLICATIONS

Jiffy App, "Jiffi-hands-free mobile ticketing & validation for mass transit," you tube, pp. 1-7, downloaded on Mar. 14, 2017 from https://www.youtube.com/watch?v=mB1_L9WPBh0.

(Continued)

*Primary Examiner* — Calvin L Hewitt, II
*Assistant Examiner* — Yingying Zhou
(74) *Attorney, Agent, or Firm* — Fay Sharpe LLP

(57) ABSTRACT

A method for trip validation includes receiving signals, on a vehicle, from one of a plurality of spaced stationary beacons on a transportation route, the signals including localization data for the respective beacon. A passenger identifier is received from a mobile communication device of a passenger on the vehicle via short range communication. Encrypted transaction data is generated, based on the user identifier, localization data, and a timestamp. The encrypted transaction data is transmitted to passenger mobile communication devices which relay the data to an associated server for processing. The method allows the location of a public transportation device to be identified without the need to provide GPS localization equipment on the vehicle.

10 Claims, 4 Drawing Sheets

(51) Int. Cl.
*H04W 4/04* (2009.01)
*G08G 1/00* (2006.01)
*G07B 15/00* (2011.01)
*G08G 1/123* (2006.01)
*H04W 4/80* (2018.01)
*G06Q 50/30* (2012.01)

(52) U.S. Cl.
CPC .............. *H04W 4/42* (2018.02); *G06Q 50/30* (2013.01); *G06Q 2220/00* (2013.01); *H04W 4/80* (2018.02)

(56) References Cited

U.S. PATENT DOCUMENTS

| | | | | |
|---|---|---|---|---|
| 8,160,045 | B1* | 4/2012 | Chhabra | H04W 52/0209 370/342 |
| 9,641,985 | B2* | 5/2017 | O'Malley | H04W 4/046 |
| 2009/0283591 | A1 | 11/2009 | Silbernagl et al. | |
| 2012/0234914 | A1 | 9/2012 | Roux et al. | |
| 2013/0185324 | A1* | 7/2013 | Bouchard | G06Q 10/0833 707/769 |
| 2013/0317742 | A1 | 11/2013 | Ulloa-Parades et al. | |
| 2013/0317747 | A1 | 11/2013 | Chidlovskii et al. | |
| 2013/0317884 | A1 | 11/2013 | Chidlovskii et al. | |
| 2014/0089036 | A1 | 3/2014 | Chidlovskii et al. | |
| 2014/0201066 | A1* | 7/2014 | Roux | G06Q 20/3278 705/39 |
| 2017/0127378 | A1* | 5/2017 | Rene | G01S 19/13 |

OTHER PUBLICATIONS

"HopOn demonstration movie," you tube, pp. 1-5, downloaded on Mar. 14, 2017 from https://www.youtube.com/watch?v=ioSethx8aXs.
U.S. Appl. No. 14/737,964, filed Jun. 12, 2015, Ulloa-Parades, et al.
U.S. Appl. No. 14/450,628, filed Aug. 4, 2014, Ulloa-Parades, et al.
Xerox Seamless™ Transportation Solution, "French City Pilots Xerox's Next-Gen Approach to Secure, Ticketless Public Transport Payment by Smartphone," pp. 1-2 (Sep. 30, 2015).
Xerox Seamless™ Transportation Solution, "A Universal System for Secure, Ticketless Public Transport Payment by Smartphone," p. 1, (2015).
Xerox Seamless™ Transportation Solution, "Opening a Highway for Mobile Payment in Transportation," pp. 1-2, Downloaded on Nov. 4, 2015 from http://www.xrce.xerox.com/Research-Development/Industry-Expertise/Transportation/Mobile-Payment-in-Transportation (Nov. 4, 2015).

* cited by examiner

LOCALIZATION OF TRANSACTION OF TAGS

BACKGROUND

The exemplary embodiment relates to public transportation and finds particular application in connection with a system and method for localization of tags used for making transport transactions.

In conventional public transportation systems, travelers pay for a trip and receive a single or multi-journey ticket which is used to verify that the traveler has paid for the trip. Prepaid tickets can be paper, magnetic or contactless cards. Such solutions often require substantial investments in infrastructure, including ticket readers, ticket dispensers, and recharging stations. Additionally, the use of tickets can cause delays in boarding of a bus at a busy stop, as each traveler takes time to provide exact change for a ticket or scans a pre-purchased ticket for validation.

More recently, systems have been proposed which allow travelers to pay for trips using smart phones which interact with a smart tag located on a transportation vehicle or at one of the stops. The passenger taps the phone on the tag at boarding and alighting locations. To minimize the cost of the tags, information on the transactions is sent by the travelers' phones to a central server where invoicing functions are performed. The tag provides the phone with information that is used to compute the price of the trip. The trip price is often based on the boarding and alighting locations and time. One problem with this approach is that for tags mounted on moving vehicles, the location changes as the vehicle moves along the route. The tag may be provided with a global positioning system (GPS) capable of generating the location information. However, this adds complexity and cost to the tags and also causes the tags to consume more power, which is an issue when the tags are battery powered. One option would be to delegate the generation of the location information to the user's phone, which is typically provided with GPS capability. However, this may raise the possibility of fraud or inaccuracy if the phone is out of GPS coverage or if its GPS capability is turned off. In addition, the delay in obtaining a valid and accurate GPS position is quite variable (it depends on GPS signal strength and time of last position acquired) and thus may not be received within a standard transport validation time of less than about one second. Another option would be to combine the time of the transaction with the operational data of an automatic vehicle location system to determine the boarding and alighting locations a posteriori. However, this would need an extremely reliable and accurate automatic vehicle location system.

Thus, it would advantageous to provide a system and method for providing location information to a transportation vehicle which is low in cost and secure.

INCORPORATION BY REFERENCE

The following references, the disclosures of which are incorporated herein in their entireties, by reference are mentioned:

U.S. Pub. No. 20140201066, published Jul. 17, 2014, entitled SYSTEM AND METHOD FOR ENABLING TRANSACTIONS ON AN ASSOCIATED NETWORK, by Pascal Roux, et al.

U.S. Pub. No. 20120234914, published Sep. 20, 2012, entitled SYSTEM AND METHOD FOR VALIDATING THAT FARES HAVE BEEN PAID, by Pascal Roux.

U.S. Pub. No. 20090283591, published Nov. 19, 2009, entitled PUBLIC TRANSIT SYSTEM FARE PROCESSOR FOR TRANSFERS, by Martin Silbernagl.

U.S. Pat. No. 6,671,737, issued Dec. 30, 2003, entitled DECENTRALIZED NETWORK SYSTEM to Dave Snowdon, et al.

U.S. Pub. No. 20130185324, published Jul. 18, 2013, entitled LOCATION-TYPE TAGGING USING COLLECTED TRAVELER DATA, by Guillaume M. Bouchard, et al.

U.S. Pub. No. 20130317742, published Nov. 28, 2013, entitled SYSTEM AND METHOD FOR ESTIMATING ORIGINS AND DESTINATIONS FROM IDENTIFIED END-POINT TIME-LOCATION STAMPS, by Luis Rafael Ulloa Paredes, et al.

U.S. Pub. No. 20130317747, published Nov. 28, 2013, entitled SYSTEM AND METHOD FOR TRIP PLAN CROWDSOURCING USING AUTOMATIC FARE COLLECTION DATA, by Boris Chidlovskii, et al.

U.S. Pub. No. 20130317884, published Nov. 28, 2013, entitled SYSTEM AND METHOD FOR ESTIMATING A DYNAMIC ORIGIN-DESTINATION MATRIX, by Boris Chidlovskii.

U.S. Pub. No. 20140089036, published Mar. 27, 2014, entitled DYNAMIC CITY ZONING FOR UNDERSTANDING PASSENGER TRAVEL DEMAND, by Boris Chidlovskii.

U.S. application Ser. No. 14/737,964, filed Jun. 12, 2015, entitled LEARNING MOBILITY USER CHOICE AND DEMAND MODELS FROM PUBLIC TRANSPORT FARE COLLECTION DATA, by Luis Rafael Ulloa Paredes, et al.

U.S. application Ser. No. 14/450,628, filed Aug. 4, 2014, entitled EFFICIENT ROUTE PLANNING IN PUBLIC TRANSPORTATION NETWORKS, by Ulloa Paredes.

BRIEF DESCRIPTION

In accordance with one aspect of the exemplary embodiment, a method for trip validation includes, on a vehicle, receiving signals from one of a plurality of spaced stationary beacons on a transportation route. The beacon signals include localization data for the respective beacon. A passenger identifier is received from a respective mobile communication device of one of a plurality of passengers on the vehicle via short range communication. Encrypted transaction data is generated, based on the user identifier, localization data and a timestamp. The encrypted transaction data is transmitted to at least one of the mobile communication devices to be relayed to an associated server for processing.

One or more of the steps of the method may be performed with a processor.

In accordance with another aspect of the exemplary embodiment, an automated trip validation device is transported by an associated vehicle on a transportation route. The automated trip validation device includes an automated vehicle location component which is moved, by the vehicle, relative to associated stationary beacons along the route. The automated vehicle location component receives localization data from each of the beacons while within range of the respective beacon. A validation component generates validation data based on a user identifier received by the automated trip validation device from a proximate mobile communication device, the localization data serving to identify a stop on the route associated with the validation data. A processor implements the components.

In accordance with another aspect of the exemplary embodiment, a method for performing transactions includes receiving transaction data from automated trip validation devices transported by transportation vehicles traveling on routes of a transportation network. Localization data, a passenger identifier, and a timestamp are extracted from the transaction data. The localization data includes a beacon identifier transmitted to one of the transportation vehicles from a beacon at a fixed location on one of the routes. A location of the beacon is retrieved from memory, based on the beacon identifier. A transaction is performed, based on the location and passenger identifier.

One or more of the extracting, retrieving and performing may be performed with a processor.

DETAILED DESCRIPTION

Figure 1:
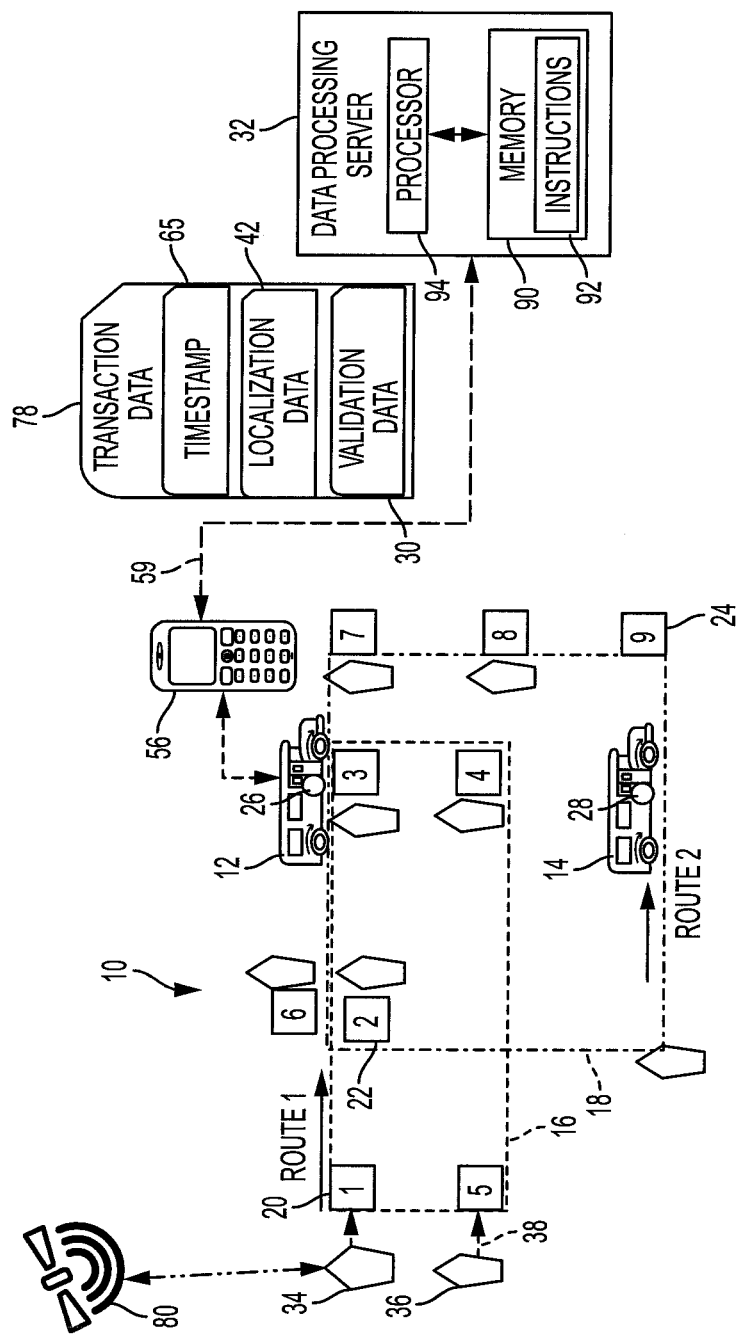
FIG. 1 illustrates a transportation network in which a localization system in accordance with the exemplary embodiment operates.

With reference to FIG. 1, an illustrative transportation network 10 includes multiple public transport vehicles 12, 14, etc., such as buses or trams. The vehicles travel on different routes 16, 18, etc. of the network 10, according to predefined schedules, to provide transportation services that are utilized by a large number of users, which may be referred to as passengers or travelers. Each route may include a set of predetermined stops 20, 22, 24, etc. (such as bus stops or tram stops), at fixed locations on the route, where passengers can board or alight from a vehicle. The transportation network 10 includes a set of automatic ticketing validation (ATV) devices 26, 28, etc., such as RFID (Radio-frequency identification) transaction tags, that collect validation data 30 for travelers, and a data processing server 32 which collects the information from the ATV devices for invoicing passengers for their trips. The ATV devices 26, 28 are each associated with a respective one of the vehicles 12, 14, e.g., mounted in the passenger area of the vehicle or by the door where passengers enter or leave the vehicle. Some vehicles may be equipped with more than one ATV device.

Associated with at least some of the stops 20, 22, 24, and/or at other fixed positions on the route, are localization beacons 34, 36, etc. The beacons may each be in the form of a smart tag attached, for example, to a post at the respective bus stops or to the ground. The beacons 34, 36 output signals 38 that provide a respective identifier of the beacon from which a location of the vehicle 12, 14, at the time the signal was received by the vehicle, can be determined. As an alternative to a beacon identifier, other localization information, such as a GPS location of the beacon, may be transmitted by the beacon.

The transportation network 10 may be a bus, rail, tram, or subway network, or may include a combination of different modes of transport.

Figure 2:
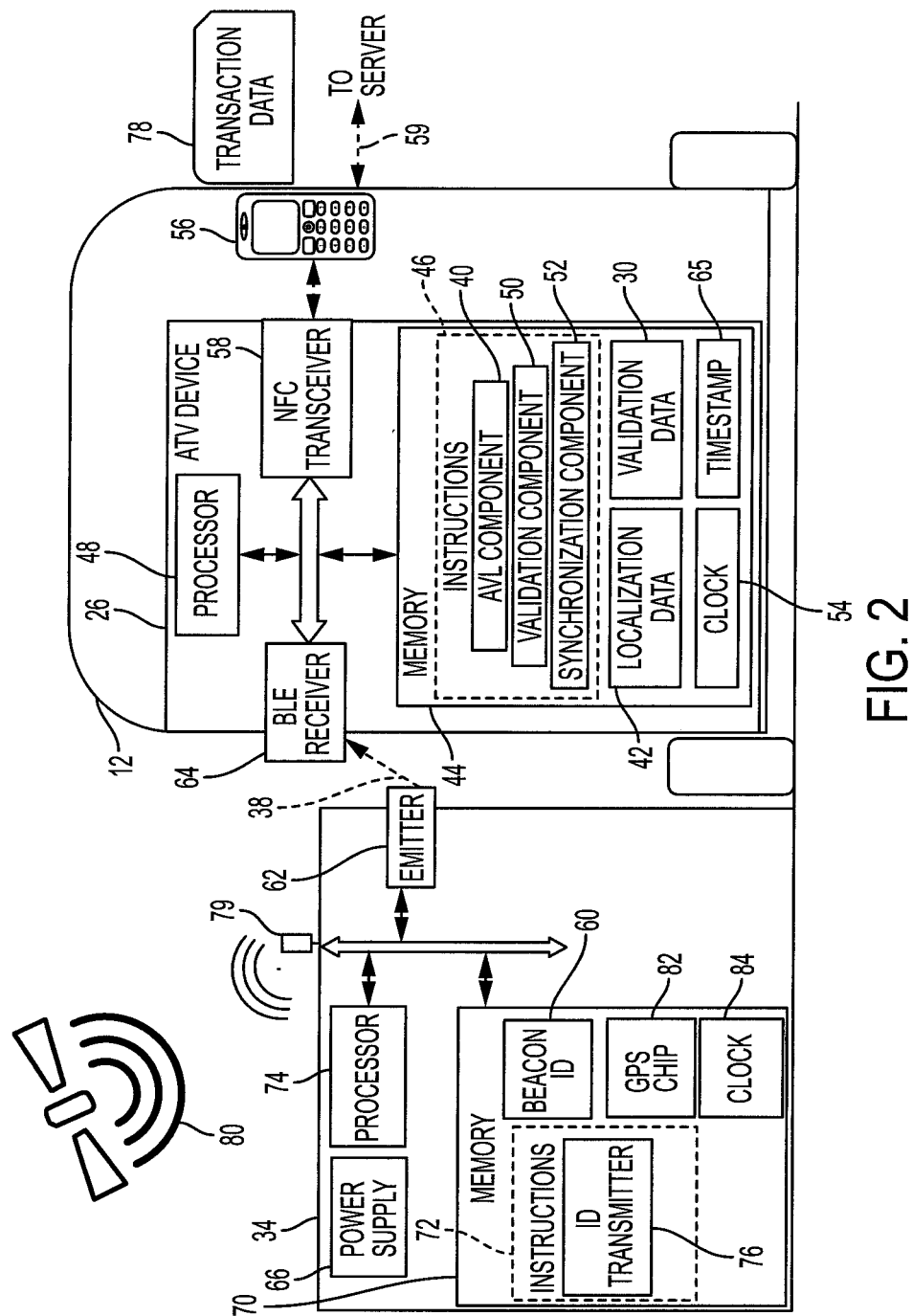
FIG. 2 is a functional block diagram of the localization system of FIG. 1.

With reference now to FIG. 2 (not to scale), each of the vehicles 12, 14 includes an automated vehicle location (AVL) component 40 which provides the data processing server 32 with localization data 42 that includes the vehicle's arrival and departure times for each stop along the route, or for at least those stops where the vehicle draws to a halt to let passengers on or off the vehicle. In the illustrated embodiment, the AVL component 40 is part of the ATV device 26, although in other embodiments, it may a separate component that communicates with the ATV device. For example, in the embodiment illustrated in FIG. 2, the ATV device 26 includes memory 44 which stores instructions 46 and a processor 48 in communication with the memory 44 executes the instructions. The instructions may include, in addition to the AVL component 40, a validation component 50, which generates the validation data 30, and a synchronization component 52, for synchronization of an on-board clock 54. The ATV device 26 may be a low powered (e.g., battery powered) RFID tag that is mounted to the vehicle, inside or outside.

Passengers each swipe the ATV device 26 to validate their trip, e.g., by touching the ATV device with their portable communication device 56 or bringing the communication device within communication range of the ATV device, such as within 3-5 cm. In the exemplary embodiment, the portable communication device 56 may be a smartphone which communicates with a transceiver 58 of the ATV device (or with separate emitter and receiver components). The mobile device 56 may be equipped with short range communication capability, e.g., Near Field Communication (NFC) to send and receive signals to/from the transceiver 58. Near field communications is a set of standards for smartphones and similar portable user devices to establish radio communication with each other by touching them together or bringing them into close proximity, e.g., within a few centimeters. The short-range wireless technologies employed in NFC operations may require a distance of 10 cm or less, or about 5 cm or less. NFC employs an initiator and a target, with the initiator capable of actively generating an RF field that can power a passive target or communicate with an active target. RFID (e.g., NFC) tags may be read-only or rewriteable, and may be custom encoded. NFC tags may be configured to provide various communication speeds, memory, security, data storage, write endurance, etc.

As described in U.S. Pub. No. 20140201066, in one embodiment, the ATV device 26 is not directly connected to the data processing server 32, but instead uses the passenger's mobile device 56 as a relay device to send the validation data 30 to the server 32, e.g., in an encrypted form. The ATV device 26 may be configured to send recent validation data 30 for a set of passengers to the mobile device 56 that swipes the ATV device, to ensure that the validation data 30 is received by the server 32. Thus, for example, if one mobile device is out of range of the communication network, a later mobile device that swipes the ATV device is able to send the validation data 30 that was unable to be transmitted earlier. The exemplary ATV device transceiver 58 includes a NFC emitter, which transmits the validation data 30 and localization data 42 to a corresponding receiver on the mobile device 56 (not shown). The mobile device sends the validation data 30 and localization data 42 to the server 32 via a suitable long-range (1 km or more) wireless network 59, such as a cellular network.

When users tap their smartphone on the ATV tags 26, this creates secure e-transactions without a network coverage requirement for the ATV tags. Prior to making a transaction on the vehicle, each user of the transportation network 10 registers and creates an account in the data processing server 32 and downloads an application to the user's mobile device

56. During registration, payment information may be provided to the server in the form of a credit card, debit account, or billing account. During setup of the application on the mobile device 56, a signed application certificate having a unique application identifier, a unique application transaction identifier, and a validity period are received from the server 32. The application is configured for sending the user identifier to the ATV device 26 via near field communication. The ATV device incorporates the user ID into the validation data 30 to be sent to the server.

The localization data 42 is sent to the server 32 via the device 56 in association with the validation data 30 so that the server can associate each transaction with relevant localization data, such as the stop ID for the stop where the passenger is likely to have boarded (or alighted). The server 32 stores a stop location for each stop ID, which allows the server to identify the stop from the stop ID.

Different types of ticket validation may be used on the vehicles 12. Some systems are "check-in only." These associate a check-in location and check-in time (approximate boarding time) with a ticket ID, but provide no check-out (alighting) information. Other validation systems are "check-in/check-out," i.e., validation is performed at both boarding and alighting, providing a timestamp and location for each.

The localization data 42 received by the AVL component 40 from the beacon 34 may include a unique identifier 60 of the respective beacon 34, which is received when the vehicle 12 passes within range of the signal 38. The beacon includes an emitter 62 which outputs the signal 38 with enough power to reach the vehicle, using short range, e.g., Bluetooth Low Energy (BLE) communication or other communication protocol with a range of about 20 meters or less, such as at least 3 meters, and in some embodiments, up to 10 meters. The ATV device 26 includes or communicates with a receiver 64, which receives the signal from the beacon. The stored localization data 42, in addition to the identifier 60 may include or be associated with a timestamp 65 corresponding to the time at which the signal was received from (or sent by) the beacon.

The exemplary beacon 34 is powered by a power supply 66, such as a battery, or may be wired to a mains power source. The beacon includes memory 70 which stores instructions 72 that are executed by an associated processor 74. In particular, the instructions may include an ID transmitter component 76 which causes the beacon's emitter 62 to transmit the signal 38, including the beacon ID 60, at a defined rate, for example from 1 to 10 messages per second. The power source for the beacon can be relatively large, such that the messages can be sent frequently without draining the power supply too quickly.

The exemplary ATV device 26 has minimal power requirements. In the exemplary embodiment, it operates without a GPS system (because the localization information is provided by the beacon) and does not need to consume power connecting to the internet, since the smartphones 56 of passengers are used to relay the transaction data 78 to the data processing server. Additionally, the ATV device does not need to rely on the user's phone 56 to provide GPS location information or a timestamp, which could be inaccurate, or, in the case of GPS, switched off.

To further minimize power requirements for the ATV device 26, the ATV device may be configured to search for the BLE signals 38 only intermittently. For example, the receiver 64 may provide for reception of the BLE signals for a short time period, periodically, e.g., for 200 ms every 300 ms, or for shorter and/or less frequent time periods. Such times are suitable for vehicles which move relatively slowly, such as up to 50 km/h, or where the beacon is located close to the stop so that the vehicle slows to a halt near the beacon. Even traveling at 50 km/hr, a vehicle which comes to within 5 m of a beacon with a range of 10 m should be in range of the beacon for 1.2 seconds (17 m), which is ample time to receive the beacon ID 60. In the case where beacons are further from the stops and/or the vehicles are moving faster, such as 70 km/hr or more, a longer range signal may be used or more frequent messages may be sent.

The time needed for recovery of the identifier 60 by the receiver 64 may be quite short (e.g., <100 ms), but the time may also depend on whether there is an authentication exchange between the ATV device 26 and the beacon 34 before the beacon ID is sent.

In one embodiment, it is assumed that if the vehicle does not stop at the stop where the beacon is located, then no passenger has boarded or alighted the vehicle at that stop. Thus, for any transactions that require the ID 60 for localization, it can be assumed that the bus will be stopped or moving slowly for long enough to obtain the signal 32.

In the case where passengers validate their tickets on boarding the bus, the signal 38 may be received by the ATV device 26 while the entry doors are still closed, allowing the beacon identifier 60 to be stored in memory 44 before boarding passengers swipe the ATV device 26. The validation data 30 for all passengers swiping the ATV device before the next stop may then be associated with the beacon ID of the last stop. In the case where passengers swipe the ATV device only on alighting from the vehicle or at both boarding and alighting, the alighting transaction may be associated with the beacon ID of the next stop. If the receiver 64 has not recently made contact with a beacon for this stop, the beacon ID of the alighting stop may be obtained after the passenger has swiped the ATV. In such cases, the beacon ID corresponding to the alighting stop may be transmitted to the server 32 via the mobile device of a subsequent passenger. In other embodiments, the destination may be preset and received in the validation information when the passenger boards the vehicle.

In addition to the beacon ID 60, the beacon 34 may transmit a time signal, which may be incorporated into the transaction data 78 and/or used by the ATV device 26 to synchronize its own clock 54. Each beacon 34 may be in communication, e.g., via an antenna 79, with a satellite 80 (or satellites) or other device having or accessing an accurate clock. For example, the beacon may include a GPS chip 82 to provide the beacon with a precise clock 84, often with an accuracy of within 3-10 nanoseconds. The drift of the clock 84 (due to temperature, initial offset of the crystal and aging) is then controlled by a frequent satellite fix (once per hour is enough to limit the drift to under 50 ms). The time provided by the GPS clock 84 is emitted by the beacon in the messages sent to the ATV device. So each time the vehicle is in range of a beacon, the synchronization component 52 is able to resynchronize automatically its clock 54 with the GPS clock 84. This allows the ATV device to provide high reliability in the transaction timestamp 65 and therefore provide greater ability to deal with disputes by limiting fraud.

The timestamp 65 in the transaction data 78 may also assist in determining the location of the transaction, where localization information is not received from the beacon.

Figure 3:
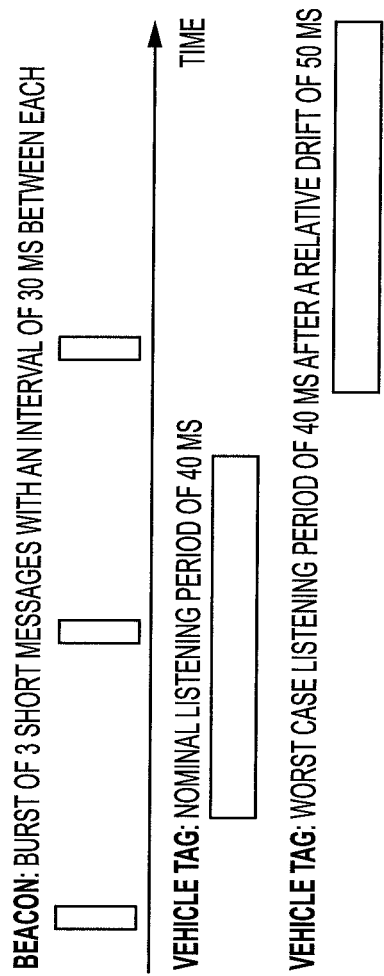
FIG. 3 illustrates synchronization of signal generation and signal receipt.

The synchronization of the on-board clock 54 with the satellite clock used by the beacons can also be used to synchronize the emissions and receptions of the messages containing the beacon ID 60. This can help to save battery life of the ATV device, since it can time its listening to the expected time periods when the beacon emits the signal. For example, as illustrated in FIG. 3, with accurate synchronization of the respective clocks 84, 54, the beacons may emit only one or a burst of a few, e.g., 3, very short messages with an interval of 20-50 ms between each message (e.g., about 30 ms between each), about 5-60 times a minute, such as about 10 times per minute. The ATV device listens only during a short period (e.g., ~40 ms) at the same time interval (e.g., 10 times per minute). This synchronization can increase the battery life by a factor of 100.

One or more securities can be added to the system to reduce desynchronization of the vehicle and beacon clocks. For example, a master beacon, such as a tag, can be installed in each vehicle depot. This master beacon is powered by the main power supply and emits its GPS clock continuously. It helps to avoid the ATV clocks 54 from drifting too much when vehicles stay at the depot for a long time. To compensate for the drift of the vehicle clock 54, the listening window of the vehicle receiver 64 can be automatically increased when it has not detected a beacon signal for a much longer time than expected. For example, if the normal listening window is 40 ms, and it can increase (e.g., progressively) up to 100 ms after 8 hours without resynchronization. After each resynchronization, the listening window is reduced to its minimal value.

There may be instances where one of the beacons stops working or the signal is not received by the vehicle (for example, the road is blocked and the vehicle is not able to move to the roadside near the stop). In such cases, the absence of a beacon signal may be detected from the collected localization data stored on the vehicle, for example, at the end of the journey or end of the day, when the collected data is retrieved. In such cases, the localization data may be inferred from prior and/or subsequent stops, giving the passenger the benefit of any doubt.

In one embodiment, location information may also be provided by the mobile device 56 to the ATV device when the ATV device is swiped. The mobile phone location information may be incorporated into to the validation data 30. This may then be compared with the location information received (or not) from the beacons as a further check on the accuracy of the localization data 42. Additionally, the vehicle may include a back-up GPS system which is activated when a beacon signal is not received. However, the cost of such a back-up system may not be justified in some cases.

To provide added security, the beacon signal 38 may be encrypted with a key, either fixed or diversified, e.g., with a beacon unique identifier or the current time, allowing false information to be ignored. In another embodiment, the ID 60 may change over time, so that even if intercepted, if it were later transmitted fraudulently, it would not be recognized by the server 32 as being a correct beacon identifier. As an example, the bus tag deciphers the beacon message to retrieve the exact time (and also the location, to avoid writing it several times in its log file so that it is available for the next passenger transaction). Given the current time the AVL component can compute the key used by the beacon. It may retry with next/previous key when the time is closed to a minute change (if the key is changed every minute) or an hour change (if the key is changed every hour).

In one embodiment, the short range receiver 64 may also serve to communicate with mobile devices 56 that are not NFC enabled. The time remaining between receiving signals from beacons may be used to issue a BLE signal identifying whether transactions with non-NFC mobile are desired.

In an exemplary embodiment, the data processing server 32 manages transactions, post-payment and invoicing. It may also provide users with access to a trip planner that proposes itineraries, modalities, duration, carbon footprint and real time information, if available. User experience is similar to current ticketing transaction in terms of performance and transaction time. Once under coverage, the transactions are securely uploaded to the data processing server 32 by user's smartphones 56. After mutual authentication between the phone 56 and the tag 26, transactions are created and encrypted by the tag 26. The transactions are uploaded from the tag to the data processing server 32 through the smartphones, where each smartphone uploads several transactions, not only its own (thus, each transaction is uploaded several times). Such a system may be fully interoperable for the users within the affiliated transport networks on which the system operates.

As illustrated in FIG. 1, the server 32 may include memory 90 which stores instructions 92 for performing such operations and a processor 94 device in communication with the memory for executing the instructions. The software instructions may include instructions for: receiving transaction data 78 (via the passenger smartphones 56) from one or more automated trip validation devices 26, 28 transported by transportation vehicles 12, 14 traveling on routes of the transportation network (for example, two sets of data may be used where a passenger makes a connection within a permitted time period); extracting the localization data 42, the validation data 30 (passenger identifier) and a timestamp 65 from each transaction data encrypted packet (the localization data including, for example, a beacon identifier 60 transmitted to one of the transportation vehicles from a beacon 34 at a fixed location on one of the routes); retrieving a location of the beacon from a suitable data structure stored in memory 90, based on the beacon identifier, and performing a transaction based on the location, time, and passenger identifier. The server may output transaction information, e.g., in the form of a bill or direct debit, for the passenger associated with the passenger ID.

The memory 44, 70, 90 may represent any type of non-transitory computer readable medium such as random access memory (RAM), read only memory (ROM), magnetic disk or tape, optical disk, flash memory, or holographic memory. In one embodiment, the memory 44, 70, 90 comprises a combination of random access memory and read only memory. Memory 44, 90 stores instructions for performing the exemplary method as well as the processed data 30, 42, 65.

The digital processor devices 48, 74, 94 can be variously embodied, such as by a single-core processor, a dual-core processor (or more generally by a multiple-core processor), a digital processor and cooperating math coprocessor, a digital controller, or the like. The digital processor 48, 74, 94 in addition to executing respective software instructions 46, 72, 92 may also control the operation of the respective tag.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4:
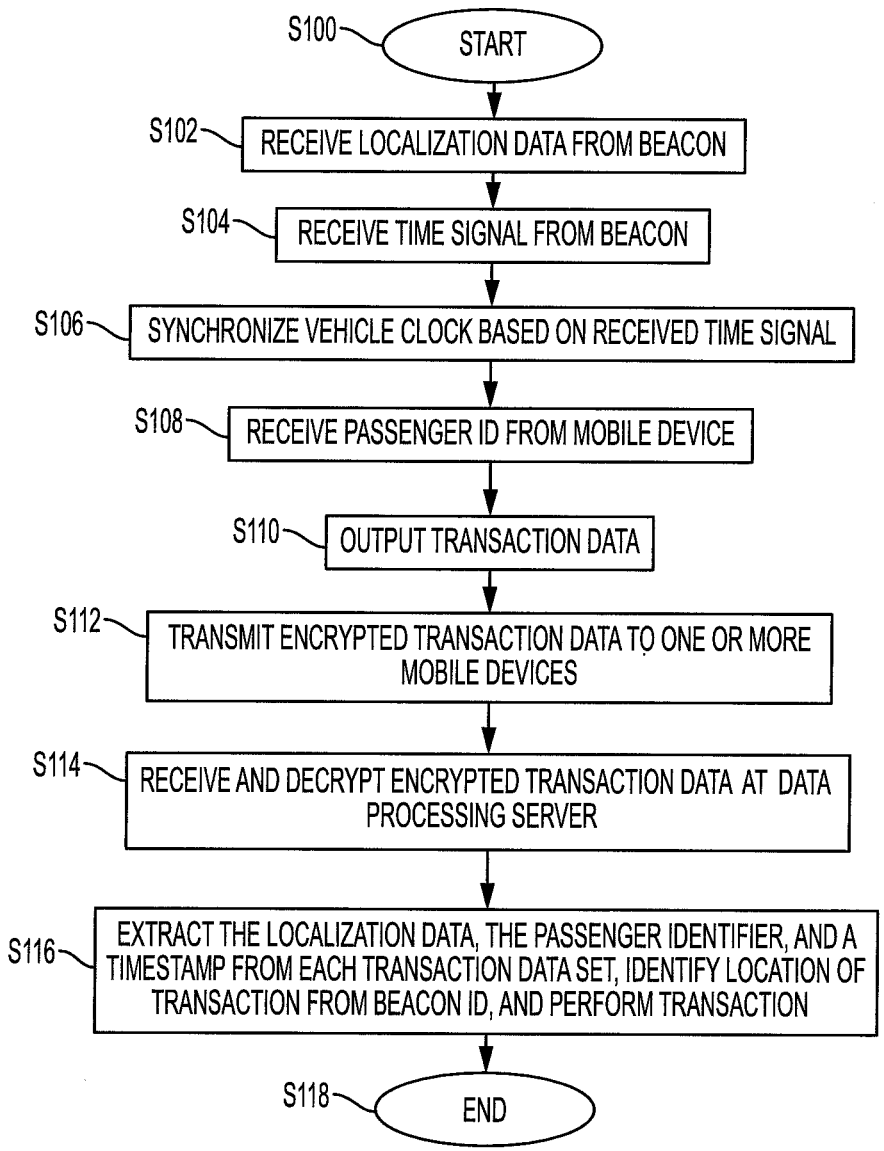
FIG. 4 is a flow chart illustrating a localization method in accordance with another aspect of the exemplary embodiment.

With reference to FIG. 4, a method for enabling transactions on a transportation vehicle is shown. The method begins at S100.

At S102, localization data 42 is received, by the AVL component 40, from one of a plurality of beacons 34, 36 spaced on a route of a transportation network by a vehicle 12 traveling on the route.

At S104, a time signal may be received from the beacon.

At S106, the time signal is used, by the synchronization component 52, for synchronization of a clock 54 on the vehicle.

At S108, a passenger boards the vehicle and swipes the ATV device with the passenger's mobile device 56. The application on the mobile device causes user information to be sent wirelessly, e.g., via NFC communication, to the transceiver 58.

At S110, transaction data 78 is output by the validation component 50 in encrypted form. The transaction data 78 may include the validation data 30 including the user ID, the timestamp 65 generated by the clock 54 corresponding to the time the AVT device was swiped, and the localization data 42, which may include the last beacon ID that was stored in memory 44.

At S112, the encrypted transaction data 78 is output by the transceiver 58 to the mobile device 56 while within range. Encrypted transaction data stored in memory for prior transactions with other mobile devices may also be sent to the mobile device for transmitting to the server 32.

At S114, the server receives the transaction data 78 and decrypts it. The data 78 may be used for completing a transaction with the passenger, e.g., for billing the passenger. The data may also be used for generating statistics on passenger travel in the transportation network. See, for example, U.S. Pub. Nos. 20130185324, 20130317742, 20130317747, 20130317884, and 20140089036, and U.S. application Ser. Nos. 14/737,964 and 14/450,628 for descriptions of how such data can be employed in understanding passenger behaviors and making suggestions based thereon.

In particular, S114 may include receiving transaction data 78 from one or more automated trip validation devices transported by transportation vehicles traveling on routes of a transportation network (for example, two sets of data may be used where a passenger makes a connection within a permitted time period).

S116 may include with the instructions 92, extracting the localization data, the passenger identifier, and a timestamp from each transaction data set, the localization data including a beacon identifier transmitted to one of the transportation vehicles from a beacon at a fixed location on one of the routes, retrieving a location of the beacon from memory, based on the beacon identifier, and performing a transaction based on the location and passenger identifier. At least one of the extracting, retrieving and performing may be performed with the processor 94.

The method ends at S118.

At least a part of the method illustrated in FIG. 4 may be implemented in a computer program product or products that may be executed on a computer or set of computers. The computer program product(s) may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with a computer (for example, an internal hard drive of RAM), or may be separate (for example, an external hard drive operatively connected with the computer), or may be separate and accessed via a digital data network such as a local area network (LAN) or the Internet (for example, as a redundant array of inexpensive of independent disks (RAID) or other network server storage that is indirectly accessed by the computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for validation of a trip on a vehicle traveling on a route of a transportation network, the vehicle including an automated ticketing validation device, the vehicle carrying a plurality of passengers with respective mobile communication devices, the route including a plurality of spaced stationary beacons, the method comprising:

receiving, by an automated vehicle location component, signals from one of the plurality of spaced stationary beacons on the route, the beacon signals including localization data for the respective beacon, the localization data including a beacon identifier;

receiving, by a receiver component or transceiver of the automatic ticketing validation device, which the vehicle transports, a passenger identifier from a respective one of the mobile communication device of one of the plurality of passengers on the vehicle via short range communication;

generating, by a processor of the automatic ticketing validation device, encrypted transaction data based on the passenger identifier, localization data and a timestamp;

transmitting, by an emitter component or the transceiver of the automatic ticketing validation device, the encrypted transaction data to at least one of the mobile communication devices; and by a server:
receiving the encrypted transaction data from the at least one of the mobile communication devices,
decrypting the encrypted transaction data,
extracting the localization data, the passenger identifier, and the timestamp from the decrypted transaction data,
retrieving a location of the beacon from memory, based on the beacon identifier, and
performing a transaction based on the location and passenger identifier.

2. The method of claim 1, wherein the localization data includes a beacon identifier, the method further comprising:
associating, by the server or the processor, the beacon identifier with a location of the beacon in memory and,
retrieving, by the server, the location of the beacon from memory.

3. The method of claim 1, wherein the beacon signals include a time signal, the method including:
synchronizing, by a synchronization component, a clock of the automatic ticketing validation device, using the time signal.

4. The method of claim 1, further comprising:
receiving, by the receiver component or the transceiver, the beacon signals via Bluetooth.

5. The method of claim 1, further comprising:
receiving, by the receiver component or the transceiver, the passenger identifier from the respective mobile communication device by near field communication.

6. The method of claim 1, further comprising:
associating, by the server, each transaction in the transaction data with a stop on the route using the localization data and a stored stop location for each stop.

7. The method of claim 1, wherein the transmitting of the encrypted transaction data to the at least one of the mobile communication devices comprises:

transmitting, by the emitter component or the transceiver, the encrypted transaction data for one passenger to the mobile device of another passenger.

8. The method of claim 1, further comprising:
receiving, by an RFID tag, the passenger identifier from the associated mobile communication device which swipes the RFID tag.

9. The method of claim 8, wherein the method includes providing the RFID tag which includes the processor.

10. A system for validation of a trip on a vehicle traveling on a route of a transportation network, the vehicle including an automated ticketing validation device, the vehicle carrying a plurality of passengers with respective mobile communication devices, the route including a plurality of spaced stationary beacons, the system comprising:
the automatic ticketing validation device including an automated vehicle location component, a receiver component and an emitter component or a transceiver, and a processing device,
the automated vehicle location component receives beacon signals from the plurality of spaced stationary beacons on the transportation route, the beacon signals including localization data for the respective beacon, the localization data including a beacon identifier;
the receiver component or transceiver receives a passenger identifier from the respective mobile communication device of one of the plurality of passengers on the vehicle via short range communication;
the processing device of the automatic ticketing validation device generates encrypted transaction data based on the passenger identifier, localization data and a timestamp; and
the emitter component or the transceiver transmits the encrypted transaction data to at least one of the associated mobile communication devices; and
a server, which stores a location of the beacon, receives the encrypted transaction data from the at least one of the mobile communication devices, decrypts the encrypted transaction data, extracts the localization data, the passenger identifier, and the timestamp from the decrypted transaction data, retrieves the stored location of the beacon, based on the beacon identifier, and performs a transaction based on the location and passenger identifier.

* * * * *